# 2,868,793
Patented Jan. 13, 1959

2,868,793
PURIFICATION OF PIPERIDINES

William H. Rieger and Leroy A. Springman, Indianapolis, Ind., assignors to Reilly Tar & Chemical Corporation, Indianapolis, Ind., a corporation of Indiana No Drawing. Application March 5, 1956
Serial No. 569,245

5 Claims. (Cl. 260—293)

This invention relates to a process of purifying piperidines. More particularly, it relates to a process of separating piperidines from the corresponding unhydrogenated pyridine.

Piperidine, i. e., hexahydropyridine, is a commercially important chemical. It is made by the hydrogenation of pyridine. This hydrogenation is usually accomplished either electrolytically or catalytically; occasionally the pyridine is hydrogenated by means of sodium and alcohol. In any case, it is not feasible, if at all possible, to hydrogenate all the pyridine present. The hydrogenation proceeds rapidly until about 80–90% of the pyridine is hydrogenated and then slows down, so much so that it is impractical to continue the hydrogenation. For many purposes a piperidine containing about 10% pyridine is satisfactory. However, some applications require a piperidine containing not more than about 2% pyridine.

An inspection of the boiling points of piperidine (106° C.) and of pyridine (115.5° C.) indicates that efficient fractional distillation might separate the piperidine from the pyridine. Such, however, is not the case. The piperidine and pyridine seem to form a constant boiling material containing about 90% piperidine and about 10% pyridine.

We have found that we can effect the separation of piperidine from the pyridine by means of carbonic acid. The piperidine forms a solid carbonate which may be separated from the liquid pyridine.

Our invention will be described more fully in conjunction with the following specific example. It should be understood, however, that this example is given by way of illustration only and our invention is not to be limited by the details set forth therein. The parts are by weight.

Example 1

To 262 parts of piperidine containing about 10–12% pyridine, there is added about 50 parts of water and about 150 parts of xylene. Carbon dioxide is added to the resulting solution. A reaction occurs causing the temperature of the mixture to rise. The addition of carbon dioxide to the mixture is continued until the carbon dioxide no longer reacts. Then the mixture is cooled to from about 10° C. to about 20° C. The crystals of piperidine carbonate formed are separated from the mother liquor in any convenient manner, such as by centrifugation. The piperidine carbonate crystals may be washed with any suitable solvent, such, for example, as a petroleum naphtha, to remove any last traces of pyridine adhering to them.

The piperidine may be recovered from the carbonate in any suitable manner. A convenient way of recovering the piperidine from its carbonate is to heat under reflux conditions a mixture of piperidine carbonate and xylene. During this refluxing the piperidine carbonate is decomposed into carbon dioxide, piperidine, and water. The carbon dioxide escapes through the reflux condenser. When all the carbon dioxide has been expelled from the refluxing mixture, the piperidine is distilled through an efficient fractionating column. The purity of the resulting piperidine is about 98% to 99% piperidine.

Another suitable way of recovering the piperidine from its carbonate is by decomposing the carbonate with caustic soda.

In place of the xylene, which we use as a diluent in the above example, we can use other diluents, such as toluene, benzene, petroleum naphtha, or the like. Or we need use no diluent but instead we can add carbonic acid to the piperidine-pyridine mixture without previously diluting it. We prefer, however, to use a diluent.

The piperidine carbonate is a new compound. It has the empirical formula $(C_5H_{12}N)_2CO_3.H_2O$. Its melting point is about 51° C. Aside from being useful in the separating of piperidine from pyridine, it is useful as a dehydrohalogenating agent in organic syntheses.

Our process is useful for the separation of piperidine from a wide range of mixtures with pyridine. Thus, we have used our process to separate piperidine from mixtures containing only as little as 5% or less of pyridine as well as from mixtures containing more than 50% pyridine.

We claim as our invention:

1. The process of separating piperidines from unhydrogenated pyridines which comprises reacting a mixture comprising a piperidine and an unhydrogenated pyridine with carbonic acid to form a solid piperidine carbonate, separating the solid piperidine carbonate from the reaction mixture, and recovering the piperidine from its carbonate.

2. The process of separating piperidine from pyridine which comprises reacting a mixture comprising water, piperidine, and pyridine with carbon dioxide to form solid piperidine carbonate, separating solid piperidine carbonate from the reaction mixture, and recovering piperidine from the carbonate.

3. The process of separating piperidine from pyridine which comprises reacting a mixture comprising water and piperidine containing about 10% pyridine, with carbon dioxide to form solid piperidine carbonate, separating solid piperidine carbonate from the reacton mixture, and recovering piperidine from the carbonate.

4. The process of separating piperidine from pyridine which comprises reacting a mixture comprising water, solid piperidine and pyridine with carbon dioxide to form piperidine carbonate, separating solid piperidine carbonate from the reaction mixture, heating the piperidine carbonate to decompose it into piperidine, carbon dioxide and water, and recovering the piperidine.

5. In the process of separating piperidine from the mixture resulting from the hydrogenation of pyridine, the steps of reacting the mixture with carbon dioxide to form piperidine carbonate, separating solid piperidine carbonate from the reaction mixture and recovering piperidine from the piperidine carbonate.

References Cited in the file of this patent

UNITED STATES PATENTS

| 2,311,134 | Schutt | Feb. 16, 1943 |
| 2,393,666 | Van Der Hoeven | Jan. 29, 1946 |
| 2,755,282 | Hachmuth | July 17, 1956 |

OTHER REFERENCES

Seibert: Chemische Berichte, vol. 80, pp. 494–502 (1947), abstracted in Chemical Abstracts, vol. 43, columns 122–124.

Smola: Mitteilungen des chemischen Forschungs, Institutes der Industrie Oesterreichs, vol. 2, pp. 38–40, 43–45 (1948). Abstracted in Chemical Abstracts, vol. 43, col. 6157–6158.